(12) United States Patent
Page

(10) Patent No.: US 9,434,030 B2
(45) Date of Patent: Sep. 6, 2016

(54) WELDING APPARATUS AND METHODS FOR WELDING

(76) Inventor: Justin Vaughn Page, Lloydminster (CA)

(*) Notice: Subject to any disclaimer, the term of this patent is extended or adjusted under 35 U.S.C. 154(b) by 608 days.

(21) Appl. No.: 12/619,252

(22) Filed: Nov. 16, 2009

(65) Prior Publication Data

US 2010/0126968 A1 May 27, 2010

Related U.S. Application Data

(60) Provisional application No. 61/117,802, filed on Nov. 25, 2008.

(51) Int. Cl.
| | | |
|---|---|---|
| *B23K 11/00* | (2006.01) |
| *B23K 37/053* | (2006.01) |
| *B29C 53/20* | (2006.01) |
| *B29C 65/10* | (2006.01) |
| *B29C 65/78* | (2006.01) |
| *B29C 65/00* | (2006.01) |

(52) U.S. Cl.
CPC ........... *B23K 37/0533* (2013.01); *B29C 53/20* (2013.01); *B29C 65/106* (2013.01); *B29C 65/7802* (2013.01); *B29C 65/782* (2013.01); *B29C 65/7841* (2013.01); *B29C 66/00141* (2013.01); *B29C 66/0222* (2013.01); *B29C 66/1142* (2013.01); *B29C 66/5221* (2013.01)

(58) Field of Classification Search
None
See application file for complete search history.

(56) References Cited

U.S. PATENT DOCUMENTS

| | | | |
|---|---|---|---|
| 1,922,913 A * | 8/1933 | Free et al. .................. 219/59.1 |
| 2,800,867 A | 7/1957 | Smith | |
| 3,196,245 A | 7/1965 | Nelson et al. | |
| 3,284,833 A | 11/1966 | Von Tersch et al. | |
| 3,284,883 A * | 11/1966 | Haverfield et al. ............. 29/256 |
| 3,596,898 A | 8/1971 | Hilburn | |
| 3,653,574 A | 4/1972 | Dearman | |
| 3,785,160 A * | 1/1974 | Banjavich et al. ........... 405/170 |
| 3,828,413 A | 8/1974 | Province et al. | |

(Continued)

FOREIGN PATENT DOCUMENTS

| CA | 10019600 | 10/1977 |
|---|---|---|
| JP | 6106346 A | 4/1994 |

(Continued)

OTHER PUBLICATIONS

Magnatech Orbital Welding Systems, The Autoweld System-Orbital Welding Equipment/Automated Welding Equipment, www.magnatech-Ip.com.

(Continued)

*Primary Examiner* — Johannes P Mondt
(74) *Attorney, Agent, or Firm* — Michael G. Johnston; Moore & Van Allen PLLC

(57) ABSTRACT

There is disclosed a welding frame for welding a first pipe having a first free end to a second pipe having a second free end; the frame comprising a first clamp for reconforming the first pipe adjacent its first free end and a second clamp for reconforming the second pipe adjacent its second free end; and a mounting frame mounting the first and second clamps in substantially coaxial relation. The first clamp and second clamp are actuable to hold the first free end of the first pipe in close coaxial opposition with the second free end of the second pipe for welding. There are also disclosed clamps for a frame for welding pipes, dies for use with the clamps, and methods for welding pipes.

11 Claims, 18 Drawing Sheets

(56) References Cited

U.S. PATENT DOCUMENTS

| | | |
|---|---|---|
| 3,870,288 A | 3/1975 | McLarnon |
| 3,881,715 A | 5/1975 | Creek |
| 3,894,326 A | 7/1975 | Merriman |
| 4,009,360 A * | 2/1977 | Beetham .................... 219/60 A |
| 4,192,167 A * | 3/1980 | Huebner et al. ................ 72/356 |
| 4,263,084 A | 4/1981 | Takala |
| 4,356,615 A | 11/1982 | Dearman |
| 4,716,271 A | 12/1987 | Hulsizer et al. |
| 5,040,716 A | 8/1991 | Stetz |
| 5,356,067 A | 10/1994 | Leduc |
| 5,732,455 A | 3/1998 | Diede |
| 5,738,386 A * | 4/1998 | Barefoot et al. ........... 285/284.1 |
| 5,814,182 A | 9/1998 | McElroy, II et al. |
| 5,830,312 A | 11/1998 | Weimer et al. |
| 5,837,966 A | 11/1998 | Timmons, Jr. |
| 5,865,430 A | 2/1999 | Conover et al. |
| 6,212,747 B1 | 4/2001 | Porter et al. |
| 6,212,748 B1 | 4/2001 | Porter et al. |
| 6,367,788 B1 | 4/2002 | Babchuk |
| 6,431,534 B1 | 8/2002 | Orosz et al. |
| 7,161,115 B2 | 1/2007 | Stecher et al. |

FOREIGN PATENT DOCUMENTS

| | | | |
|---|---|---|---|
| JP | 10047536 | 2/1998 | |
| JP | 2006281217 A * | 10/2006 | ............. B23K 9/028 |

OTHER PUBLICATIONS

AMI, Arc Machines, Inc., www.arcmachines.com.
Pro-Fusion, Accu-Fit Tub Alignment Clamps, www.profusiononline.com.
McElroy, McElroy's Operator's Manual No. 412 & No. 618 Fusion Machines, www.mcelroy.com.
Mannion, Bernard. "The Fundamentals of Orbital Welding," Welding Design & Fabrication Magazine, Feb. 1999.
Justin V. Page, International Searching Authority, Patent Corporation Treaty International Search Report, International Application No. PCT/CA2009/001665, mail dated Feb. 2, 2010.
Zap-Lok, Zap-Lok Pipeline Systems, Inc., http://zap-lok.com/works.html, printed Jun. 29, 2010.
Huisman Equipment, Line-up Systems, accessed Feb. 3, 2012, http://www.huismanequipment.com/en/products/pipelay_components/lineup_systems.
Justin V. Page, Australian Application No. 2009319652, Notice of Acceptance, Jan. 3, 2014.

* cited by examiner

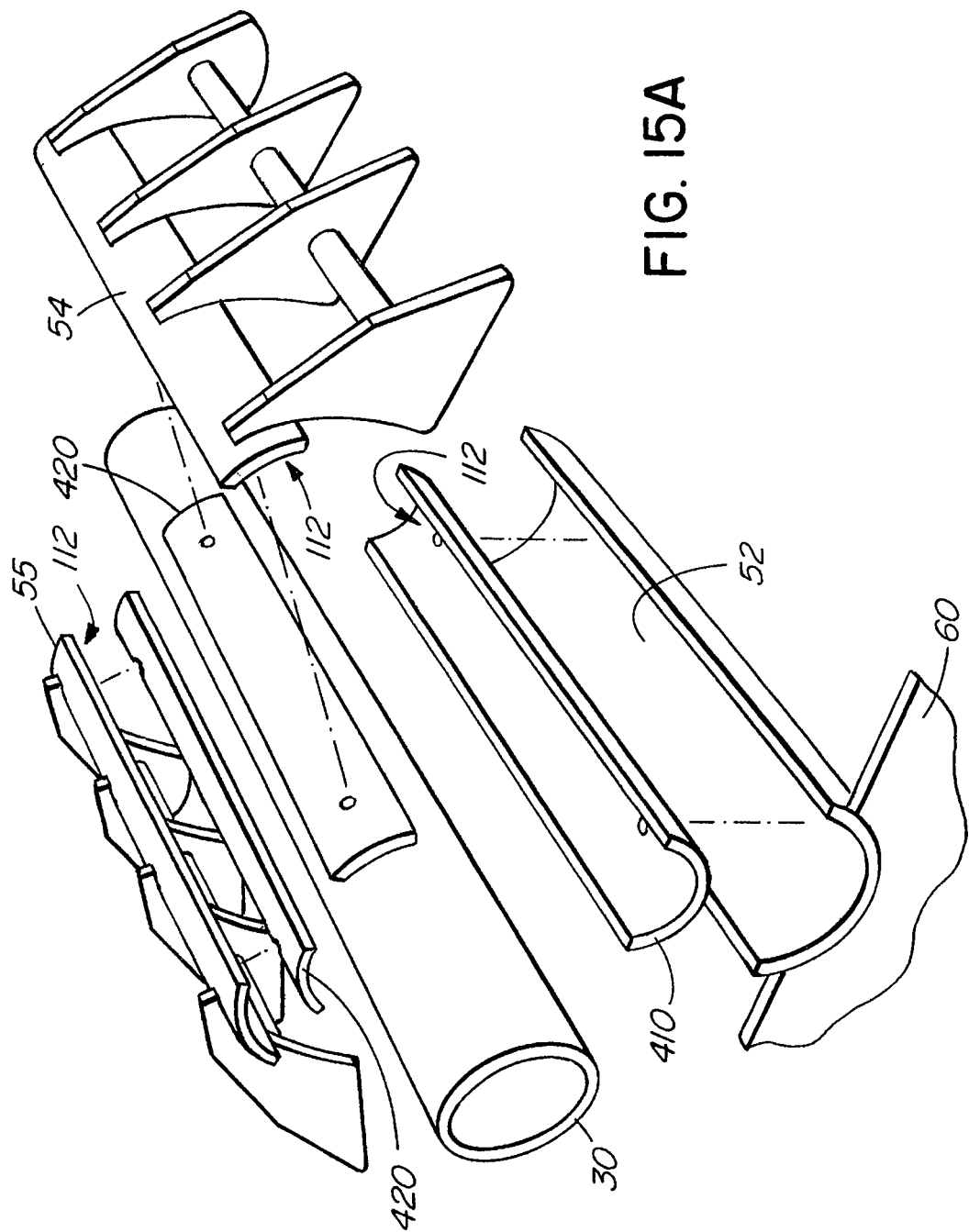

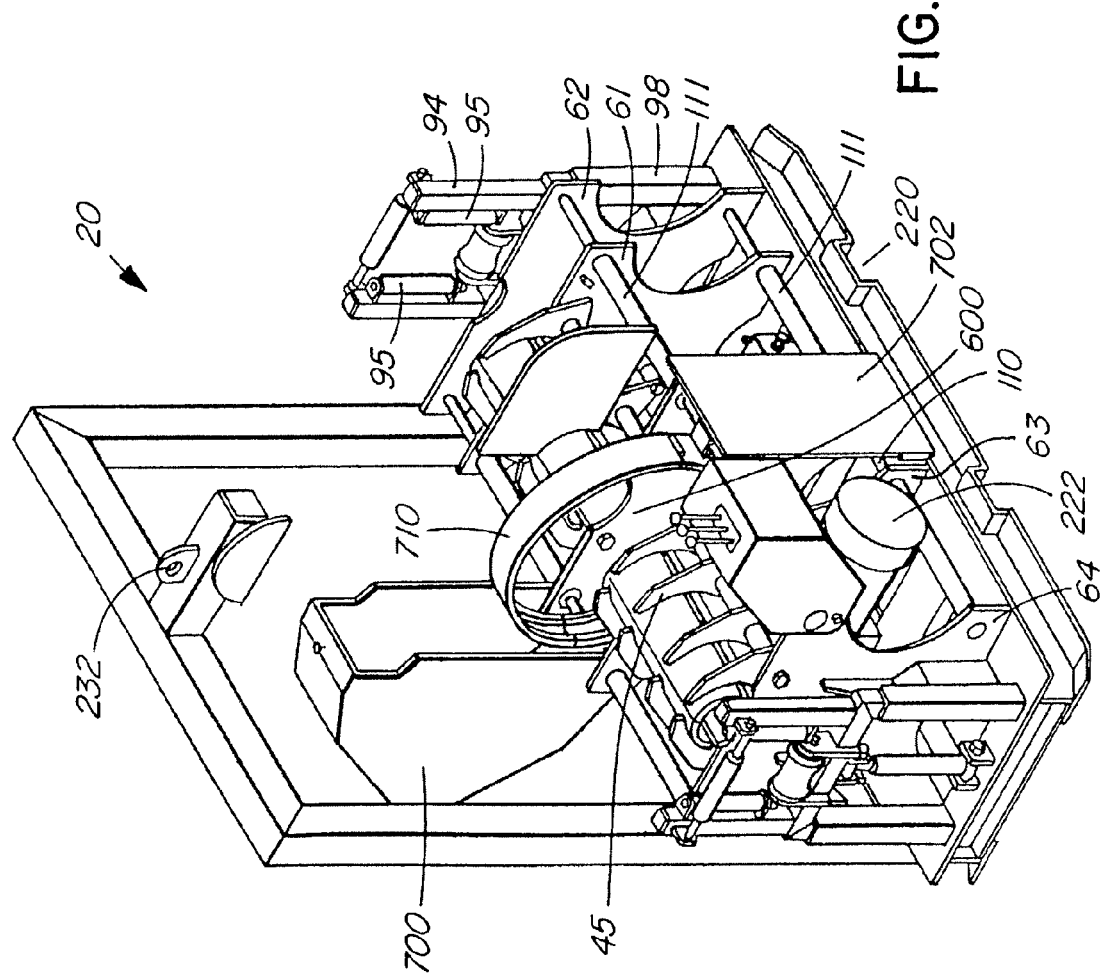

WELDING APPARATUS AND METHODS FOR WELDING

CROSS-REFERENCES

This application is related to U.S. provisional application No. 61/117,802, filed Nov. 25, 2009, entitled "Orbital Welding Apparatus and Methods for Making and Using Same", naming Justin Vaughn Page as inventor. The contents of the provisional application are incorporated herein by reference in their entirety, and the benefit of the filing date of the provisional application is hereby claimed for all purposes that are legally served by such claim for the benefit of the filing date.

FIELD

The subject matter disclosed generally relates to a welding apparatus and a method of welding.

RELATED PRIOR ART

A variety of orbital welding designs are known in the art. U.S. Pat. No. 6,431,534 to Orosz et al., issued Aug. 13, 2002, discloses a clamping tool for aligning tubes comprising at least one solid angle clamping member which is free of welds and can withstand numerous heating and cooling cycles. U.S. Pat. No. 5,732,455 to Diede, issued on Mar. 31, 1998 discloses a tubing welding jig comprising a weld head support and one or more tube support pedestals having a top groove for supporting a tube in alignment within the weld head. U.S. Pat. No. 5,830,312 to Weimer et al. issued on Nov. 3, 1998 discloses a butt fusion apparatus with clamping jaws for clamping pipes to be fused without interference between the clamps and the pipe.

SUMMARY

In a first embodiment, there is provided an apparatus for welding a first pipe free end to second pipe free end. The apparatus may comprise a first clamp for reconforming the first free end; and a second clamp for reconforming the second free end. The clamps may be actuable to hold the second free end in close coaxial opposition with the first free end.

In alternative embodiments; one of the clamps may be actuable to adjust the distance between the opposed free ends and may be adapted to receive a cooperating channel defining die whereby the die at least partly defines a pipe receiving channel. The apparatus may further comprise a welder and the welder may be an orbital welder. The second clamp may be coaxially moveable relative to the first clamp. The movement may be along a guide rail. The apparatus may further comprise a cover. The pipe receiving channel may define an annulus and the pipe may be a metal pipe. One of the clamps may be actuable to compressively reconform a free pipe end. The apparatus may be actuable to bring the free pipe ends into close coaxial opposition and the pipe free ends may be between about 1 inch and about 50 inches in diameter, or between about 2 inches and about 12 inches in diameter.

In another embodiment, there is provided a pipe clamp for a welding machine. The clamp may be actuable to reconform a free end of a pipe to be welded.

In alternative embodiments, the clamp may be moveable along a guide rail relative to a second coaxially opposed pipe clamp. The second clamp may be actuable to reconform a free end of pipe to be welded. The clamp may accept a cooperating channel defining die to thereby at least partly define a pipe receiving channel. The clamp may be adapted to receive a plurality of alternate cooperating channel defining dies to thereby optionally define a plurality of alternate pipe receiving channel cross sections. The clamp may comprise a trough.

In a further embodiment, there is provided a pipe reconforming die which may be adapted to cooperatingly engage a pipe reconforming clamp to thereby at least partly define a pipe receiving channel. The clamp may be moveable relative to a second coaxially opposed clamp.

In a still further embodiment, there is provided a kit which may comprise a set of pipe reconforming dies for cooperating engagement with a pipe reconforming clamp; and instructions to use the dies to define a pipe receiving channel.

In another embodiment, there is provided a method for welding together first and second pipe free ends. The method may comprise reconforming and holding together the first and second free pipe ends in close coaxial opposition.

In alternative embodiments, the method may comprise the steps of: reconforming the free pipe ends; holding the reconformed free pipe ends in close coaxial opposition; and welding the opposed free pipe ends together. The pipe ends may be orbitally welded together. The method may comprise reconformingly clamping the free pipe ends; using coaxially opposed reconforming clamps to hold the free pipe ends. The clamps may be adapted to receive reconforming dies. One of the pipe free ends may be a free end of a pipeline. The method may further comprise adjusting the distance between the clamps to position the opposed free ends relative to each other. One of the pipes may have a diameter of between about 2 inches and about 50 inches, or a diameter of between about 2 inches and about 12 inches.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

FIG. 15A is an exploded view of a portion of a first embodiment showing the assembly of a clamp and dies.

FIG. 20 is a front perspective view of an apparatus according to a second embodiment with an open cover.

DETAILED DESCRIPTION OF EMBODIMENTS

Terms

Figure 1:
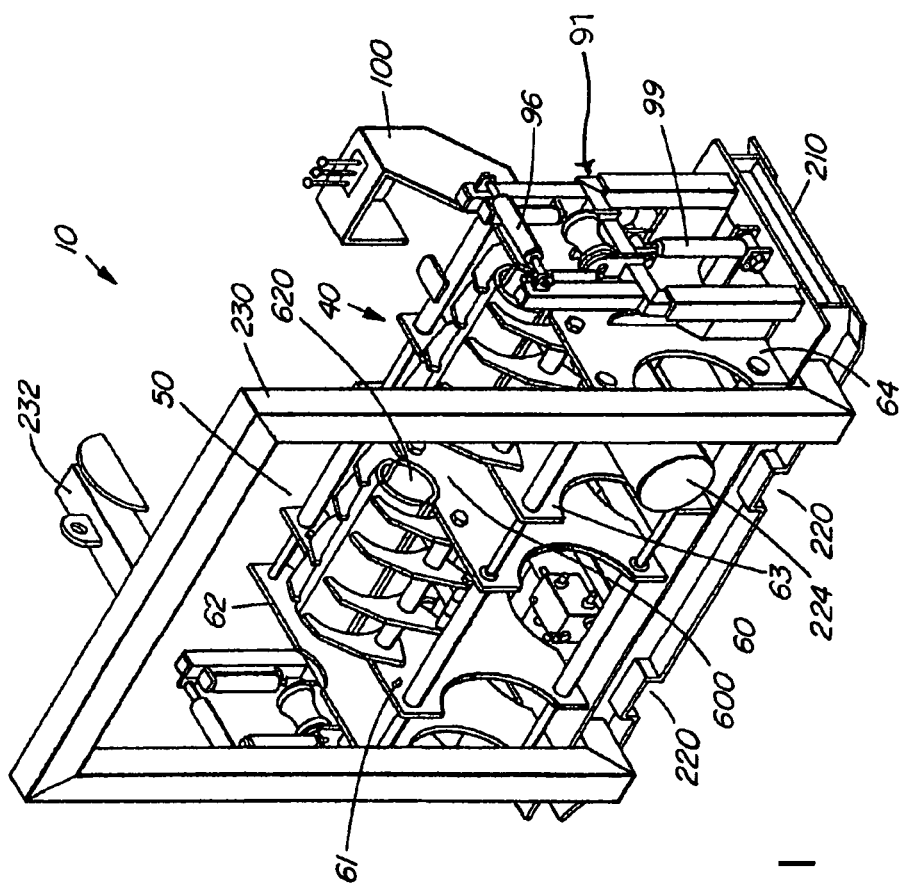
FIG. 1 is a rear perspective view of an apparatus according to a first embodiment.
Figure 2:
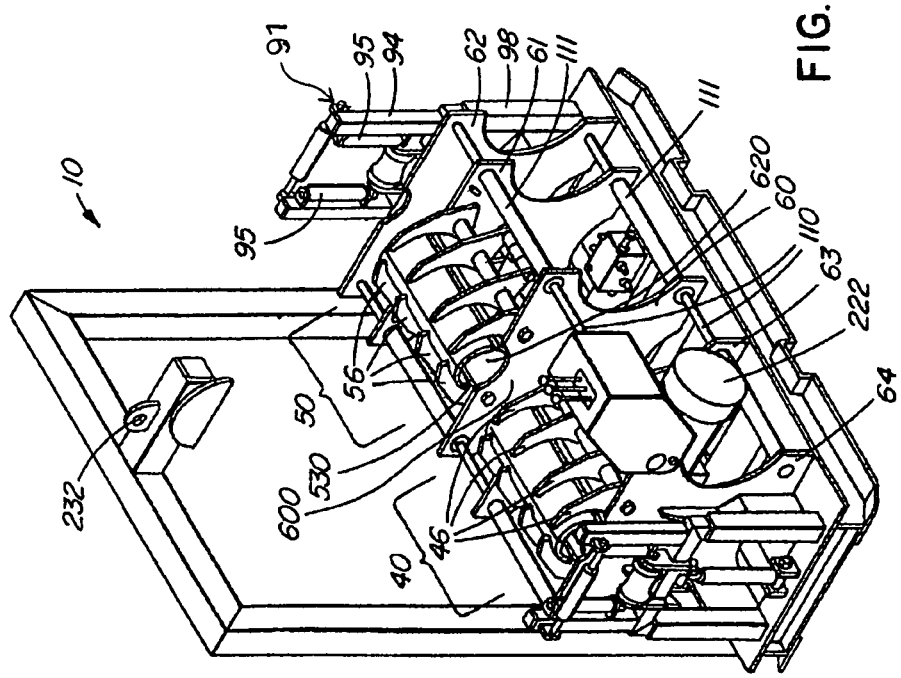
FIG. 2 is a front perspective view of FIG. 1.
Figure 3:
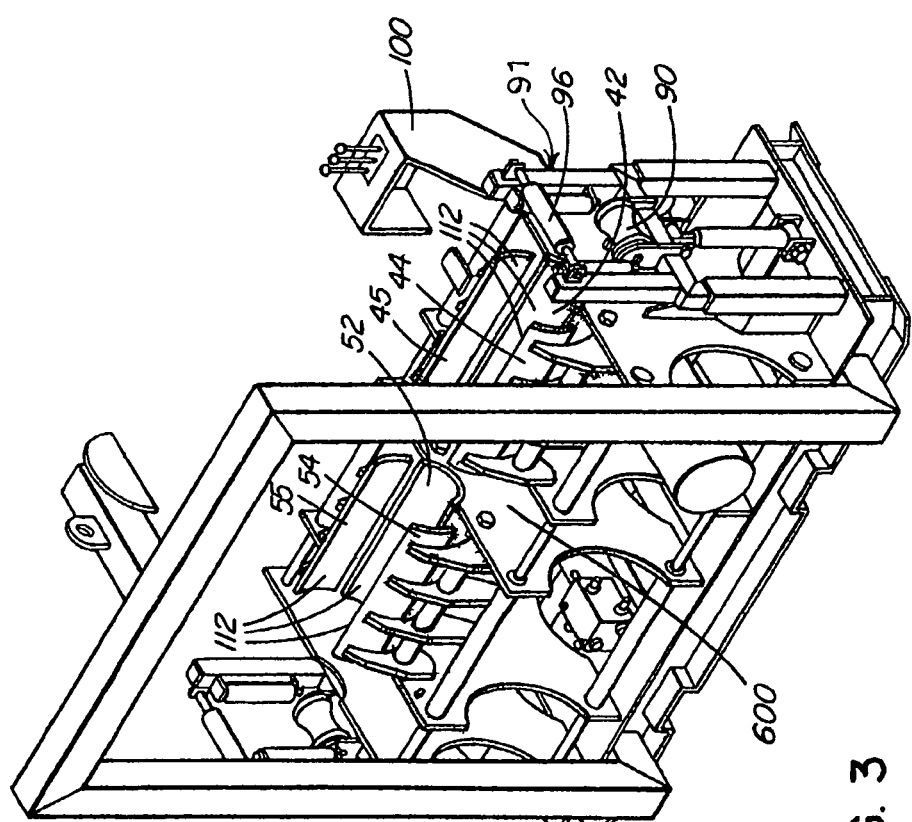
FIG. 3 is a perspective view according to FIG. 1 with clamps open.

In this disclosure the term "pipe" refers to an elongated hollow tubes of metal, plastic or other suitable material as may used for the conveyance of water, gas, steam, petroleum, or other materials. In particular embodiments pipes may have a range of cross sectional shapes and dimensions all of which will be readily understood and implemented by those skilled in the art. In particular embodiments the pipes may be metal pipes, may be generally cylindrical, and may have diameters of between about 1 inch and about 50 inches or between about 2 inches and about 12 inches. In alternative embodiments, pipes may have diameters of less than about 50 inches, or of between about 20 and about 15 inches, between about 15 and about 10 inches, about 10 and about 5 inches, or may have diameters of greater than about 20 inches or less than about 5 inches. In embodiments pipes may have a diameter of less than about one 48 inches, less than about 50, 46, 42, 36, 30, 24, 18, 17, 16, 15, 14, 13, 12, 11, 10, 9, 8, 7, 6, 5, 4, 3, 2 or 1 inches, or greater than about 48 inches. It will be apparent that while the embodiments illustrated are adapted for the handling of broadly cylindrical pipes, a range of alternative cross sections are possible with suitable adjustments to the design of the clamps and dies in ways readily apparent to those skilled in the art. By way of illustration and not limitation, the cross sections of pipes may be polygonal, square, oval or the like and in these cases it will be desirable to ensure proper cross sectional alignment of the pipe ends to be welded. Similarly, while the embodiments illustrated are adapted for the end to end welding of only two opposed pipe ends, with suitable modifications embodiments may be adapted to weld joints of any configuration and to join multiple pipes at one point, all in ways readily apparent to those skilled in the art.

In this disclosure the term "jaw" means the opposed part or parts of a clamp that may be useable to grasp, compress or otherwise hold a workpiece that may be or may comprise a pipe. It will be appreciated that a jaw may be a trough as defined herein, and that in alternative embodiments clamps may comprise one, two, three, four, five or more jaws and that in embodiments on or more jaws may be actuable to exert compressive pressure on a workpiece which may be a pipe.

In this disclosure the term "clamp" means an appliance or assembly, optionally comprising two or more opposed or partly opposed sides, parts, jaws or surfaces, that may be adjusted or otherwise positioned to grip, immobilise, or compress a workpiece which may be a pipe. In embodiments clamps may be actuable to compress their respective workpiece pipes and in alternative embodiments may be actuated hydraulically, mechanically, manually, electrically or by any other suitable means, all of which will be readily identified and implemented by those skilled in the art. In embodiments a die may be secured to a receiving surface of a clamp by a variety of conventional means as set out in the description.

In this disclosure the terms "die" and "reconforming die" mean a structure for forming or reconforming a workpiece to a desired configuration. Terms may include and refer to shaped elements for conforming or reconforming a pipe to a desired cross section, for instance by compressing the pipe to conform to the configuration of a pipe receiving channel defined by one or more such dies. It will be understood that such dies will be formed from suitable materials to reform the workpiece pipe in use, having reference to its flexibility, stiffness, hardness and other relevant properties. It will be further understood that for any given application the dies to be used will be selected for use with a clamp to define a channel of suitable dimensions to reconform a selected workpiece pipe. In embodiments opposed clamps will be fitted with suitable die sets to ensure that the free ends of opposed clamped pipes adopt substantially compatible cross sections to facilitate welding them together.

In this disclosure the term "reconform" means to reshape a workpiece so that it adopts a desired configuration. In embodiments reconforming may be permanent or transient depending on the material and the apparatus used to achieve such reconforming. In embodiments reconforming may be achieved by a clamp shaped and sized to force a selected workpiece, such as a pipe, into a desired configuration. In particular embodiments reconforming a pipe may comprise forcing the cross sectional shape of the pipe or pipe end into a desired configuration which may be a circular configuration. Such reconforming may be achieved by compressive clamping to force the pipe or other workpiece into a desired conformation. It will be understood that the pipe receiving channel defining the desired workpiece configuration will be chosen with reference to the properties of the subject workpiece.

In this disclosure the term "coaxial opposition" means with reference to pipe ends that end portions of the pipes are coaxially aligned with their free ends mutually opposed. The term "close coaxial opposition" means that the opposed free ends of two such coaxially opposed pipes are brought into close proximity with each other for instance into such proximity that they can be welded together to desired specifications or using desired methods.

In this disclosure the term "guide rail" means a rod, rail or equivalent structure that serves to guide or restrict the movement of a part of an apparatus.

In this disclosure the term "welder" or "welding device" means any device suitable for performing a welding operation, and may comprise a welding torch, may comprise positioning and controlling machinery, and may comprise or may be an orbital welding device which may comprise a suitable mounting ring or structure upon which a welding torch may be moved manually or by suitable control apparatus.

First Embodiment

A first embodiment of an apparatus is generally designated 10 and is described generally with reference to FIGS. 1 through 19. The first embodiment may be or comprise a welding frame 230 and may comprise a clamp for a welding apparatus and a method for welding pipes.

In broad aspect as best seen in FIGS. 1 through 19 the apparatus of the first embodiment 10 may comprise a welding frame 230 for welding a first pipe 20 having a first free end 22 to a second pipe 30 having a second free end 32. The apparatus 10 may comprise a first clamp 40 for reconforming said first pipe 20 adjacent said first free end 22 and may comprise a second clamp 50 for reconforming said second pipe 30 adjacent said second free end 32. The embodiment may also comprise a mounting frame 230 for mounting said first and second clamps in substantially coaxial relation, said first clamp 40 and said second clamp 50 being positioned to hold said first free end 22 of said first pipe 20 in close coaxial opposition with said second free end 32 of said second pipe 30. In embodiments the first clamp 40 and second clamp 50 may be elongated or may each comprise a plurality of coaxially aligned clamps and may be adjustable in position, angle and relative disposition in ways readily apparent to those skilled in the art.

In greater detail, as seen particularly in FIGS. 1, 2, 3, 6, 7 and 16 through 19, the frame 230 may comprise a lifting bracket 232 for engagement by a hook, chain or other suitable implement, for lifting and may comprise suitable forklift slots 220 to facilitate moving the apparatus 10. In the illustrated embodiment where the apparatus is operated hydraulically the frame may comprise or bear suitable hydraulic apparatus including a hydraulic motor 222 and a hydraulic tank 224. A control unit 100 may be mounted on the frame 230 or otherwise associated with apparatus 10. In alternative embodiments relative movement of parts of the apparatus 10, such as relative movement of the jaws 44, 45, and trough 42, and of the clamps 150 and 160, may be achieved manually, hydraulically, electrically, or by any conventional means, all of which will be readily apparent to and implemented by those skilled in the art.

First clamp assembly 150 comprises a first clamp 40 having a trough 42 and two opposed jaws 44, 45, which when closed together with the trough define a first channel 48. The assembly may further comprise associated structures necessary to operate and guide the movement of the clamp and to adjust the alignment thereof. The jaws 44, 45 may comprise a series of teeth 46 and clamping plates 400 defining clamping surfaces 402 of a desired shape and may be pivotable on axles 130 to open and close the clamp 40 to grip a first pipe 20 and through radial pressure to reconform the first pipe 20 by defining the cross section of a first channel 48 and compressively reconforming the cross section of the pipe 20 to that of the channel 48. It will be apparent that the cross sectional shape and dimensions of channel 48 will be chosen to approximate that of the pipe 20. As described further with respect to alternative embodiments, this may be partly achieved by the provision of suitable dies for mounting on the clamping surfaces 402.

Second clamp assembly 160 may likewise comprise a second clamp 50 having a second trough 52, and second jaws 54, 55 with clamping plates 500 defining clamping surfaces 502 of a desired shape and similarly rotatable about axles 510 to open and close clamp 50 to grip and through radial pressure reconform second pipe 30 of suitable size by defining a second channel 530. It will be appreciated that in embodiments the clamping surfaces of one or more clamps may be either continuous or discontinuous and where discontinuous this may be achieved by providing a plurality of coaxially aligned clamps operable in coordination. Again, the dimensions of the channel 530 will be chosen to approximate the cross sectional dimensions of second pipe 30.

Figure 4:
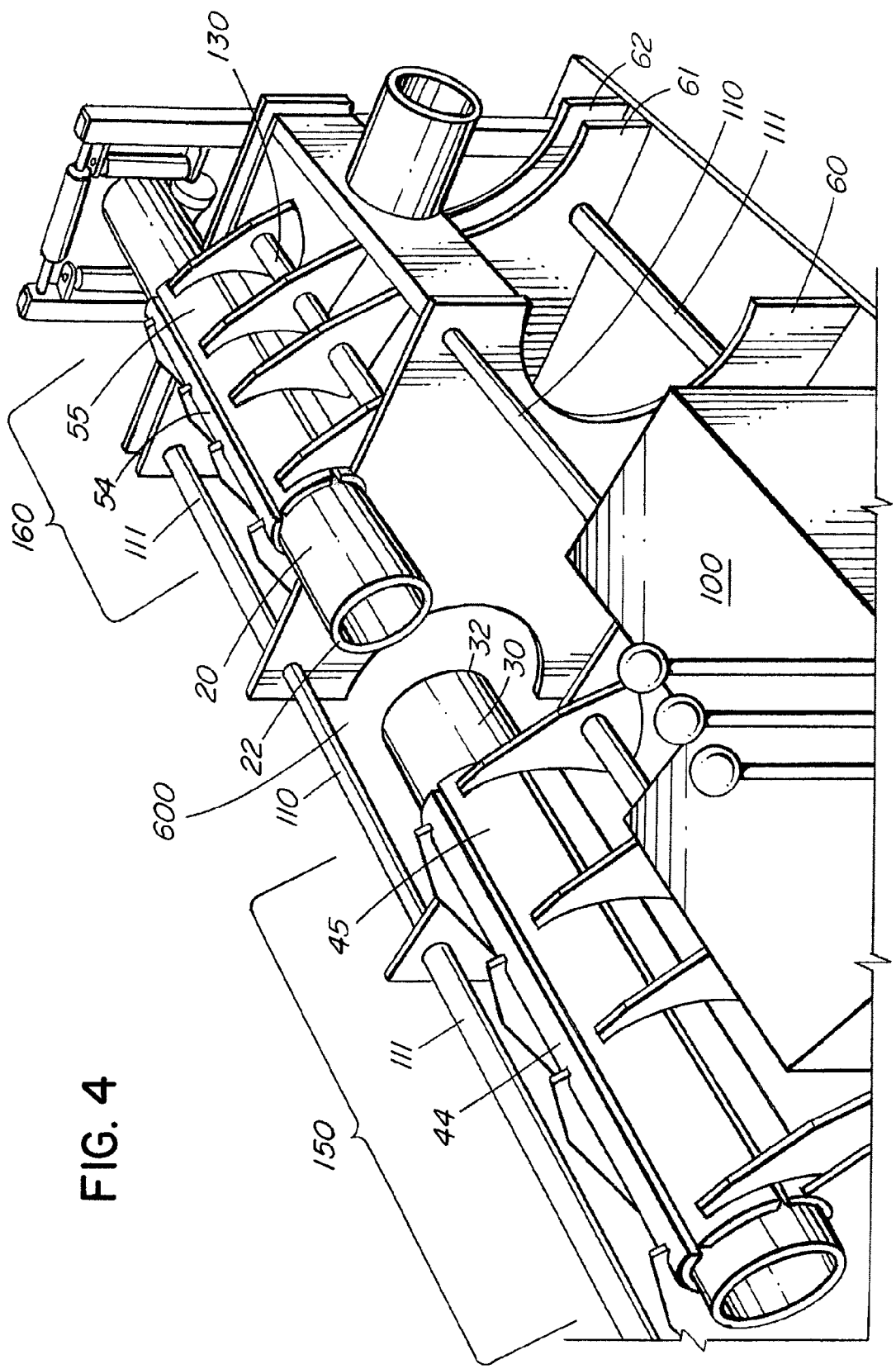
FIG. 4 is a magnified perspective view of the clamping arrangement of FIG. 2 showing the clamping of opposed pipes in mutually distanced relation.
Figure 5:
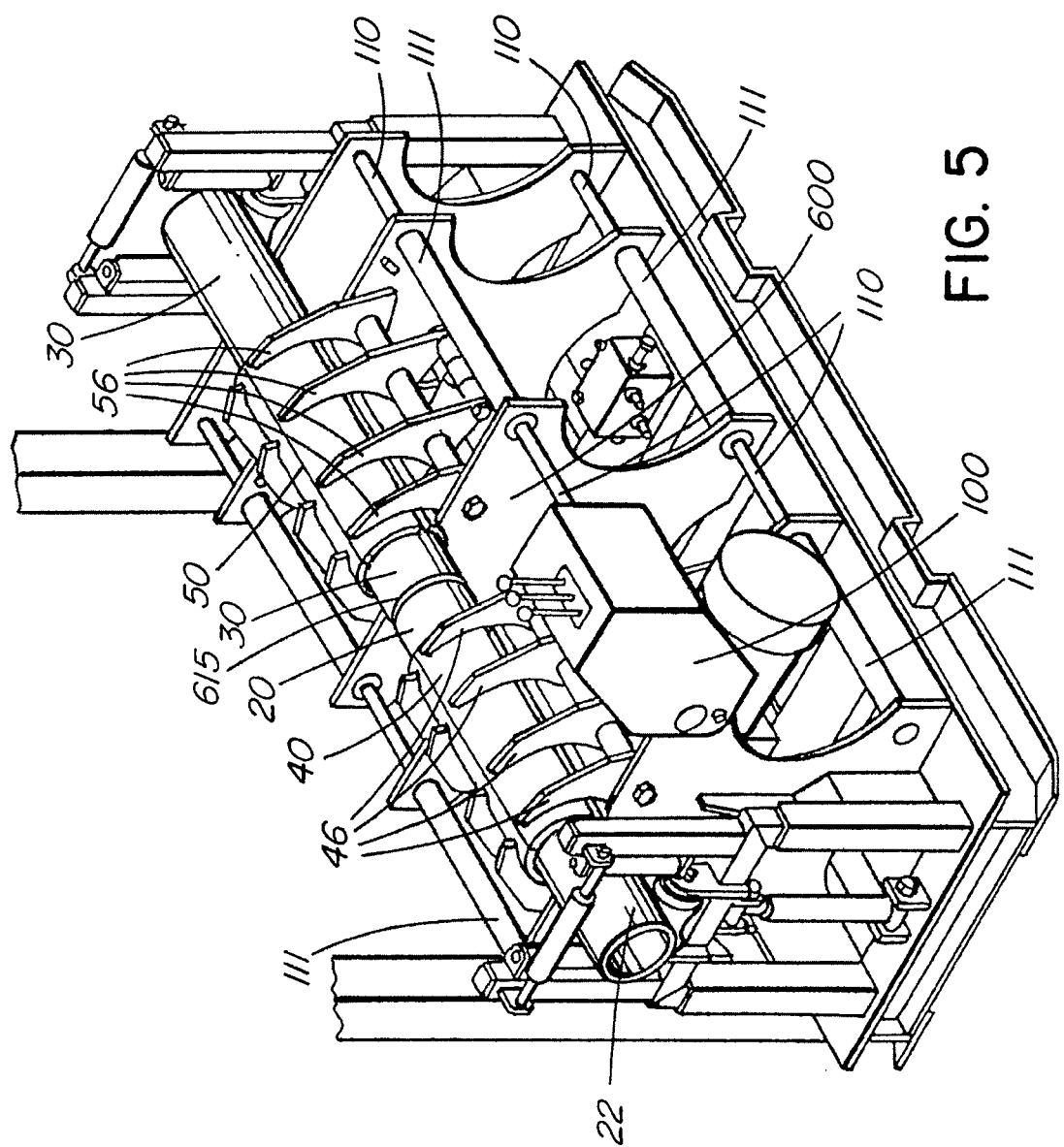
FIG. 5 is an alternate perspective of the embodiment according to FIGS. 2 and 4, showing opposed pipes brought into closely opposed relationship.
Figure 6:
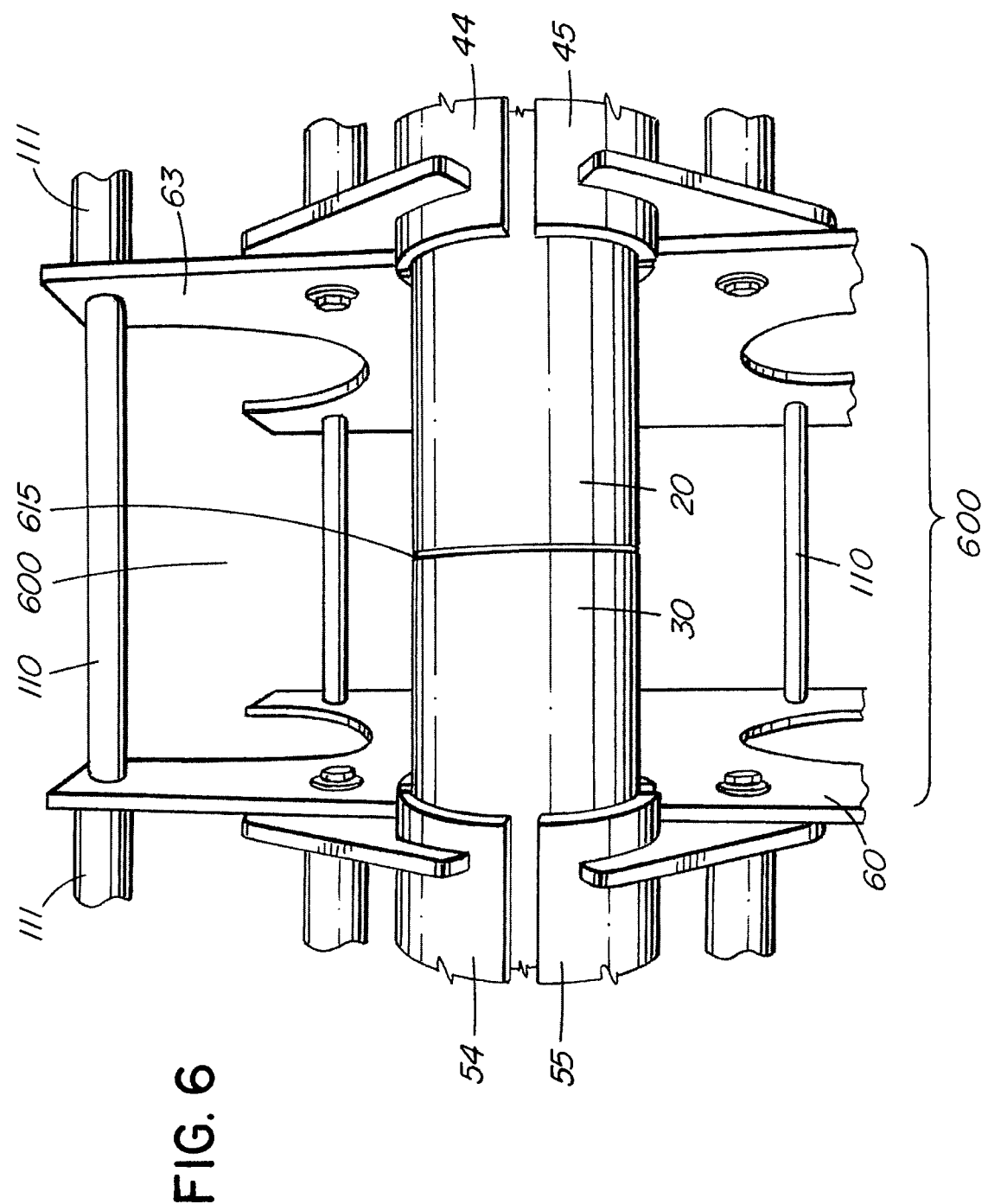
FIG. 6 is a perspective close up view of closely opposed clamped pipe ends.
Figure 7:
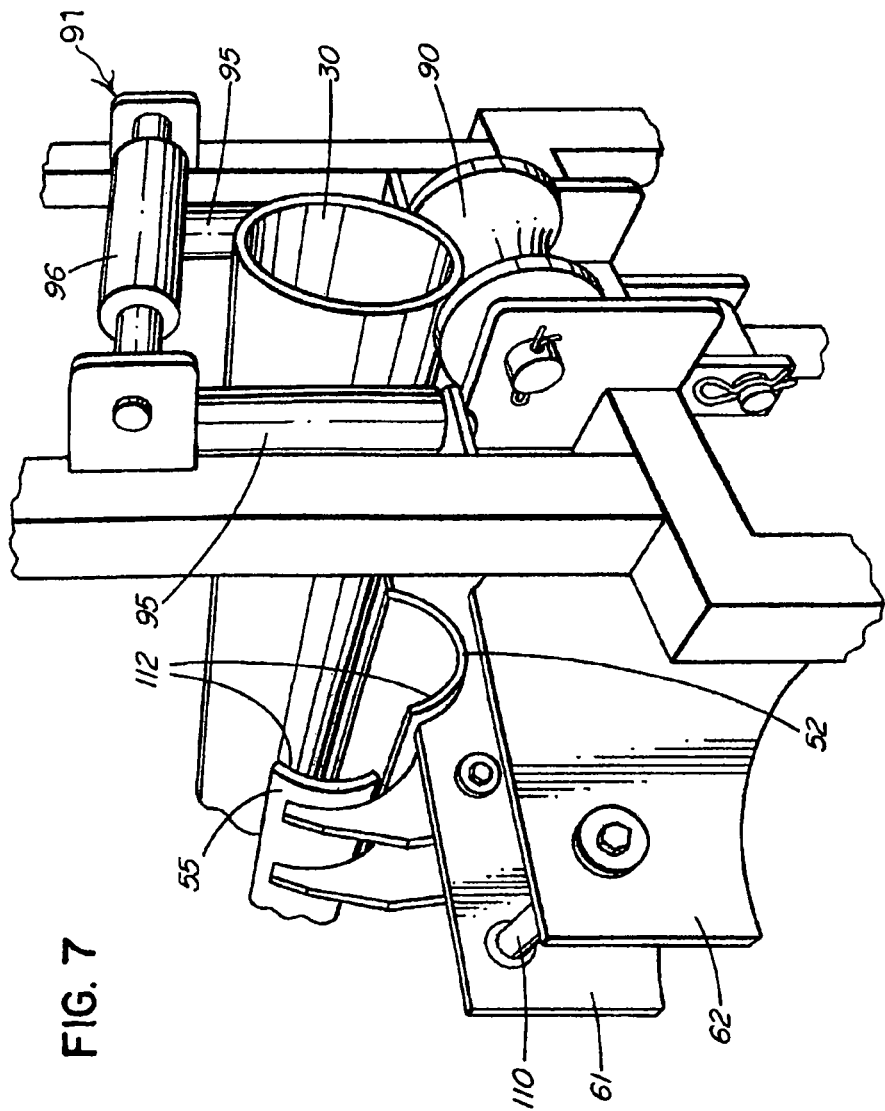
FIG. 7 is a perspective view of the first embodiment showing a pipe in position on a guide roller.
Figure 8:
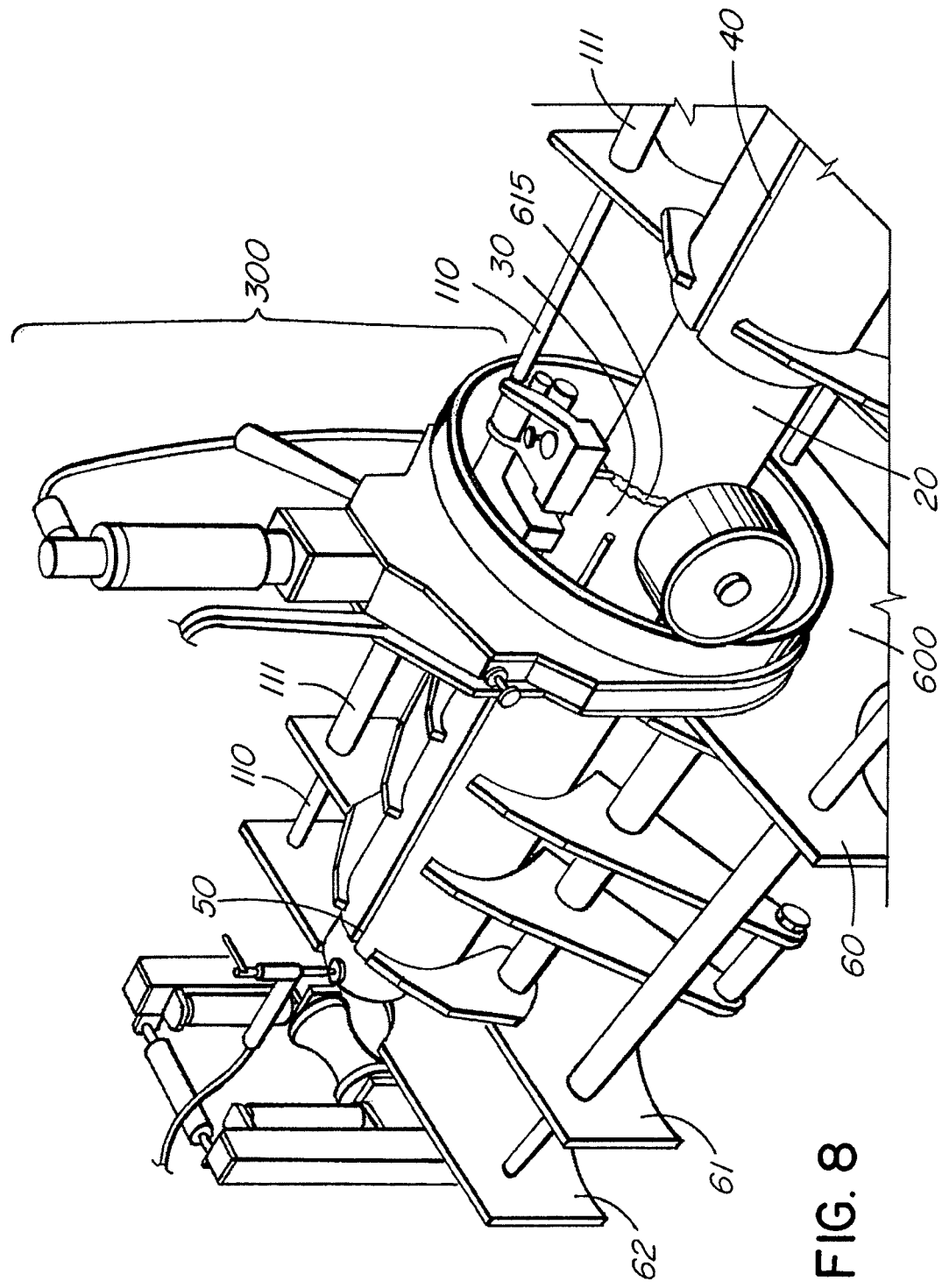
FIG. 8 is a view of an embodiment comprising an orbital welder.
Figure 9:
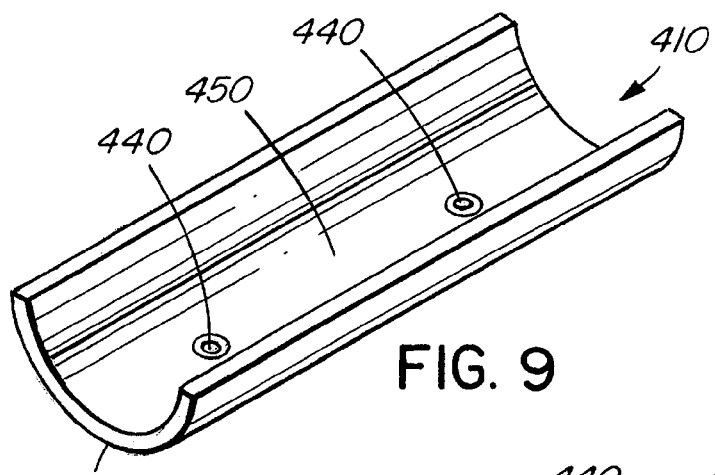
FIG. 9 is a perspective view of a trough die according to an embodiment.
Figure 10:
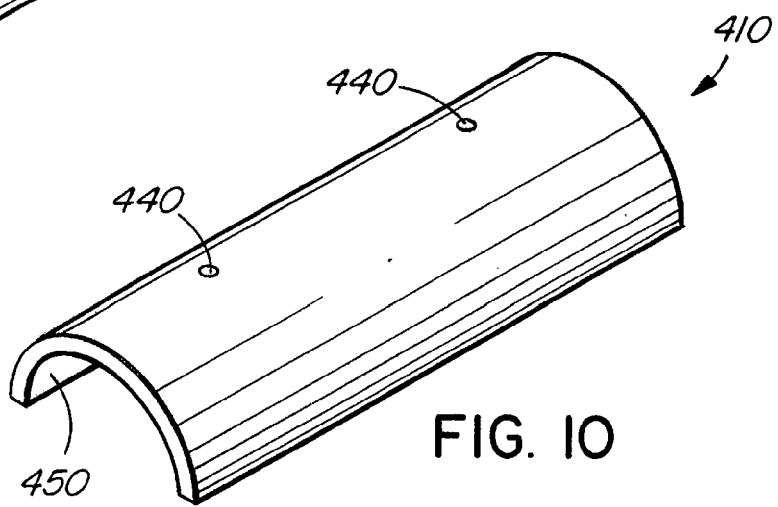
FIG. 10 is an alternative perspective view of FIG. 9.
Figure 11:
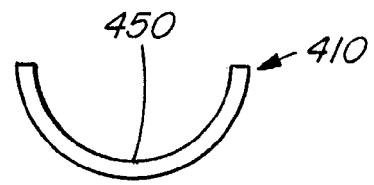
FIG. 11 is an end view of a die according to FIG. 9.
Figure 12:
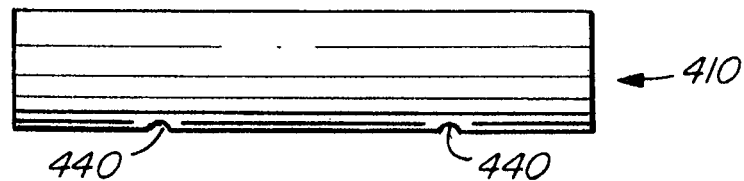
FIG. 12 is a side view of a die according to FIG. 9.
Figure 13:
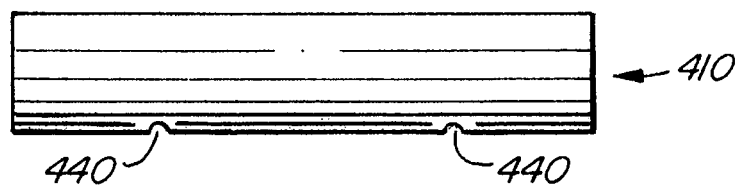
FIG. 13 is opposite side view of FIG. 12.
Figure 14:
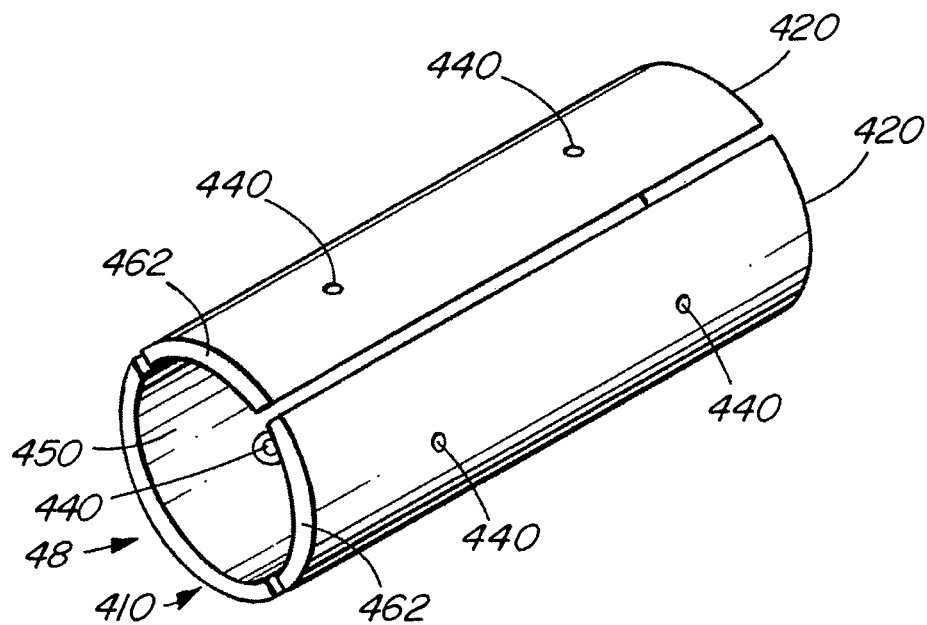
FIG. 14 is a perspective view of the relative cooperating arrangement of dies according to an embodiment.

Each of first and second clamp assemblies 150, 160 may comprise at least one respective clamp, 40, 50 together with mounting end plates 60, 61, 63, 64 and one or more of the clamps or clamp assemblies may be slideable coaxially relative to the other of the clamps or clamping assemblies along guide rods or rails 110. It will be seen that in the illustrations (for example in FIGS. 1 through 6), it is second clamp assembly 160 which is moveable along rails 110. FIG. 4 shows clamping assembly 160 displaced towards the associated roller assembly leaving a greater distance or space 610 between the first and second clamping assemblies 150, 160 and thus between their respective clamped pipes with their opposed pipe ends 22, 32. A further end plate 62 may be present at the end of the apparatus 10 distal to a moveable second clamping assembly 160, which may be moveable along guide rods 110 extending between the first clamp assembly 150 and the end plate 62 using sleeves 111 which may be slideable along rods 110.

Welding space 600 between the opposed first channel end 610 and second channel end 620 may thus be lengthened or shortened to control the proximity of free pipe ends 22 and 32 which may thereby be brought together at a welding line 615. In one embodiment illustrated with reference to FIG. 8 the apparatus may be a frame for an orbital welder 300 and an orbital welding assembly may be provided at the welding space 600 in ways readily understood and implemented by those skilled in the art. It will be appreciated the same function may be carried out manually or by a range of alternative methods and may be partially or completely automated or may be partially or completely manually controlled.

At one or both ends of the welding frame 10 and as best seen with particular reference to FIGS. 1, 2, 3, 7, 17 and 19 there may be provided guide roller assemblies generally designated 91 and each comprising one or more supporting guide rollers 90, one or more lateral rollers 95, and one or more upper rollers 96, all mounted on a vertically adjustable frame 94 moveable by a piston assembly 99 and guided by guide channels 98. In operation the guide roller assembly 91 may be raised for the purposes of accepting a pipe, then lowered to rest the pipe in the relevant trough, and subsequent to welding may again be raised to facilitate relative movement of the welded pipe and clamp surfaces.

As indicated above, reconforming dies 410 and 420 may be provided for insertion into the clamps to provide clamping surfaces suitable to define channels of predetermined sizes. Dies according to an embodiment are described with particular reference to FIGS. 9 through 14. Dies 420 may fit on the inner clamping surfaces of jaws 44, 45, 54, 55 and where a jaw forms a trough, die 410 may similarly fit on the inner clamping surface of a troughs 42 or 52. In the illustrated embodiment, dies 410, 420 are secured to clamp jaws or troughs by means of suitable bolts which may be inserted through suitable countersunk holes 440 and secured in corresponding anchor points provided in the cooperating jaw or trough. A range of alternative methods to secure the dies will be readily apparent to and adopted by those skilled in the art and may include clips, hooks, screws, cooperating protrusions and recesses, hook and loop structures, magnetic engagement systems or others. In embodiments the dies into the clamps may be replaceable to change the defined cross section of the thus defined channel, so that channels of alternative desired cross sections may be readily provided by the use of different dies having different thicknesses and shapes. In embodiments a plurality of dies may be provided to allow a user to optionally define channel cross sections of different predetermined dimensions and shapes by changing the set of dies used. Only the trough die 410 is illustrated in detail but it will be apparent that clamp dies 420 may be similarly constructed with suitable adjustments in dimension and geometry. It will be apparent that the dies will be sized to cooperate with the dimensions and design of the trough and clamps to sit securely therein during operation of the clamps and the inner clamping face 450 of the dies may be shaped to accept or create a range of desired pipe cross sections. It will be understood that the dies, clamps, jaws and other components of the apparatus may preferably be made of suitably strong and rigid materials for reconforming the workpiece pipe or pipes. A range of suitable metals, ceramics, plastics and other materials will be readily identified, selected amongst and implemented by those skilled in the art. It will be understood that in embodiments the dies and clamping surfaces may be modified in a variety of ways to add desired texture to the outer surfaces of clamped pipes, or to prevent slippage or movement of the pipes.

As explained with particular reference to FIGS. 4, 5, 6 and 8 the welding apparatus may be used for welding a first pipe 20 to a second pipe 30. Pipes 20 and 30 may comprise a first free end 22 and a second free end 32 respectively as shown in FIG. 1 and the pipes may each have substantially the same diameter which may be less than about 20 inches. One or both of the first clamp 40 and second clamp 50 may comprise more than one jaw, and a jaw may be a trough. A clamp may be elongated and may be up to about one inch long, up to about 2, 3, 4, 5, 6, 7, 8, 9, 10, 11 or 12 inches long, or up to about 18, 24, 30, 36, 42, 48, 54, 60 or more inches long or may be longer. In embodiments an overall clamp length may be collectively achieved by a series of coaxially aligned clamps of shorter dimension. In the latter case any dies may be sized to be collectively mounted on a group of such clamps together, or just on one clamp. In the illustrated embodiment each clamp comprises a lower trough to receive a pipe, and two opposed jaws able to close to form a channel in cooperation with the trough. It will be understood that in alternative embodiments the trough may be omitted or its shape or width altered, the numbers of jaws and troughs may vary and the elongated surface of the clamp may be continuous or discontinuous and may be replaced by a plurality of coaxially aligned clamps. All that may be required is that the provided jaw structures be suitable to define a channel of a predetermined cross section, which may be achieved using inserted pipe reconforming dies as described herein.

In an embodiment one of the first clamp assembly 150 and second clamp assembly 160 is coaxially moveable relative to the other. In the embodiment illustrated the second clamp assembly 160 may be coaxially moveable relative to the first clamp assembly 150 which may be substantially fixed relative to the frame 230. In an embodiment wherein one of the clamp assemblies is not moveable relative to the frame, this fixed clamp may be used to accept the fixed end of a pipeline to be extended and the moveable clamp will be used to accept successive ones of individual pipe lengths to be welded onto the free end of the growing pipeline. When one pipe length has been added to the pipeline, the apparatus may be moved along the so that the free end of the last individual pipe length added now becomes the free end of the pipeline and the welding process can then be repeated as often as necessary until the pipe is of the desired length.

Naturally in this mode of use it may be desirable that the apparatus be moveable and be on wheels or otherwise slideable, and may be self powered. In embodiments railings, mounts or other structures may be provided to facilitate the manual or automated progression of the apparatus as the pipeline is extended incrementally. With appropriate control systems the process of incrementally extending a pipeline from a free end may be partly or substantially wholly automated by the provision of suitable systems for the delivery of free pipe lengths, the alignment of opposed pipe ends, the execution of any grinding, bevelling, and welding, and the movement of the apparatus to a newly created free end of the pipeline. In embodiments the apparatus 10 may further comprise an orbital welding torch assembly operable to mutually weld the opposed free ends of first and second pipes and may be a frame for an orbital welder 300. In alternative embodiments the apparatus may comprise a wind shield or cover, may have wheels, may be portable, may be self powered, may be self-propelled, and may be partly or completely automated.

Figure 15B:
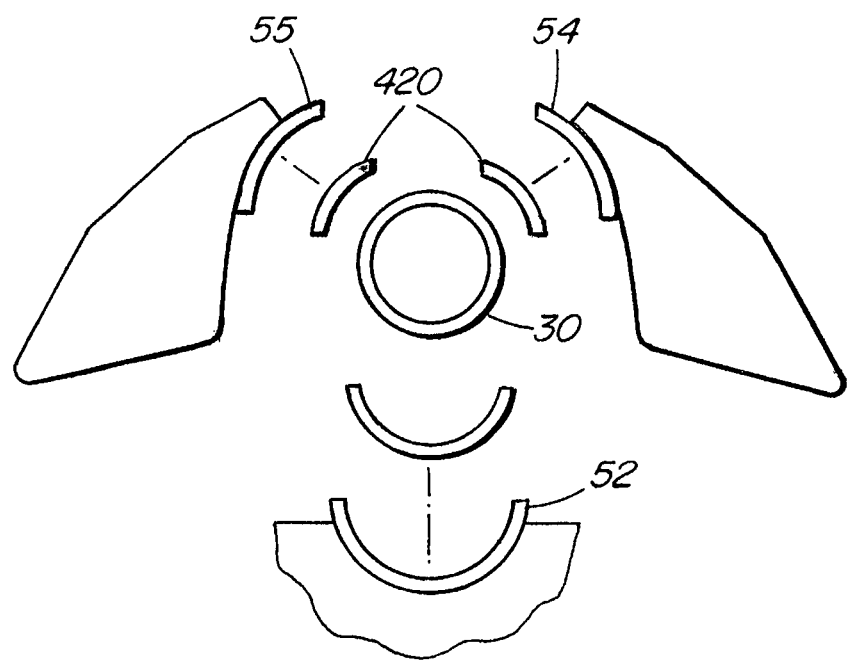
FIG. 15B is an end view of FIG. 15A.
Figure 17:
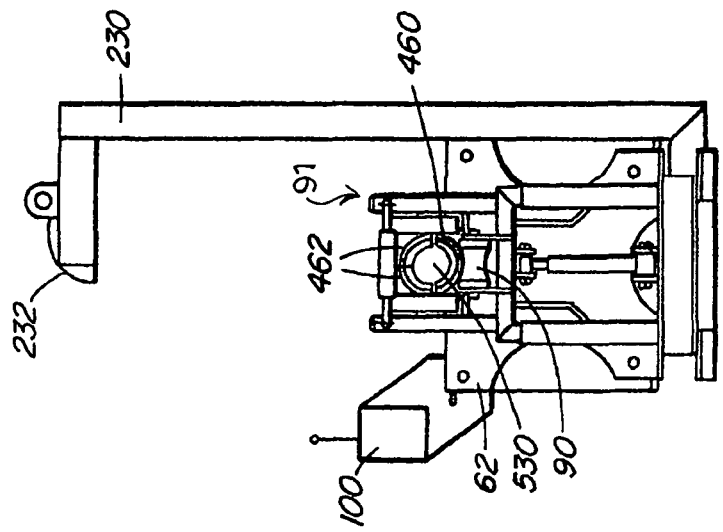
FIG. 17 is a first end view of the embodiment according to FIGS. 1 and 2.
Figure 16:
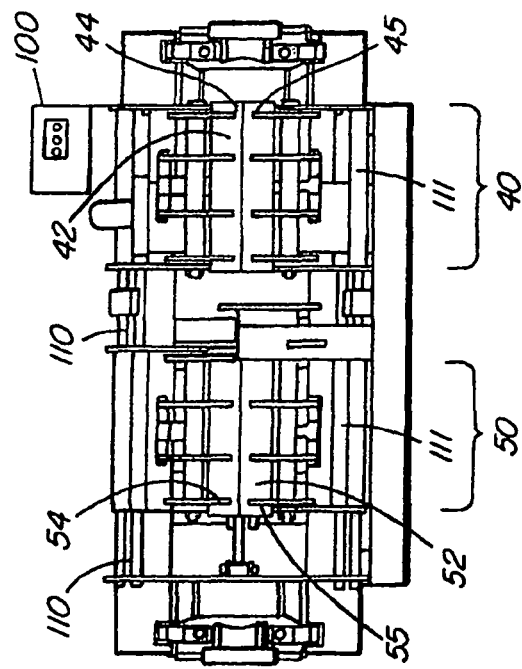
FIG. 16 is a top view of the embodiment according to FIGS. 1 and 2.
Figure 19:
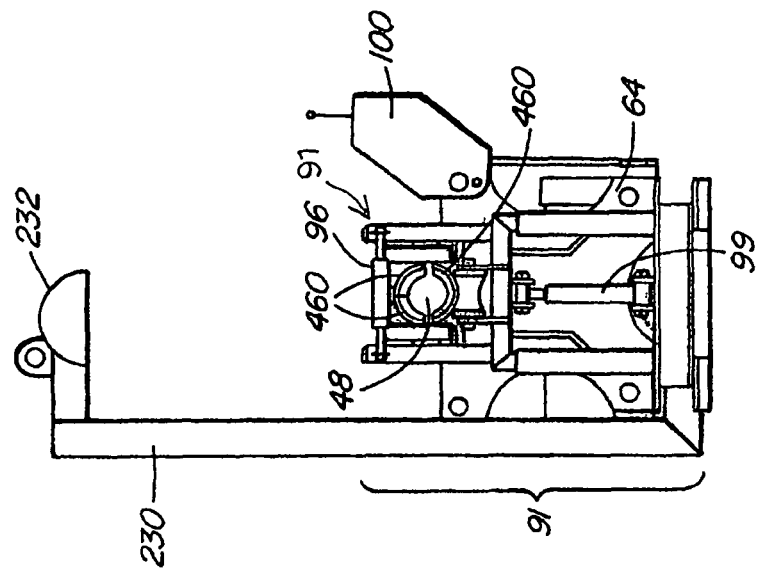
FIG. 19 is an end view of the embodiment according to FIGS. 1 and 2 taken at the opposite end from FIG. 17.
Figure 18:
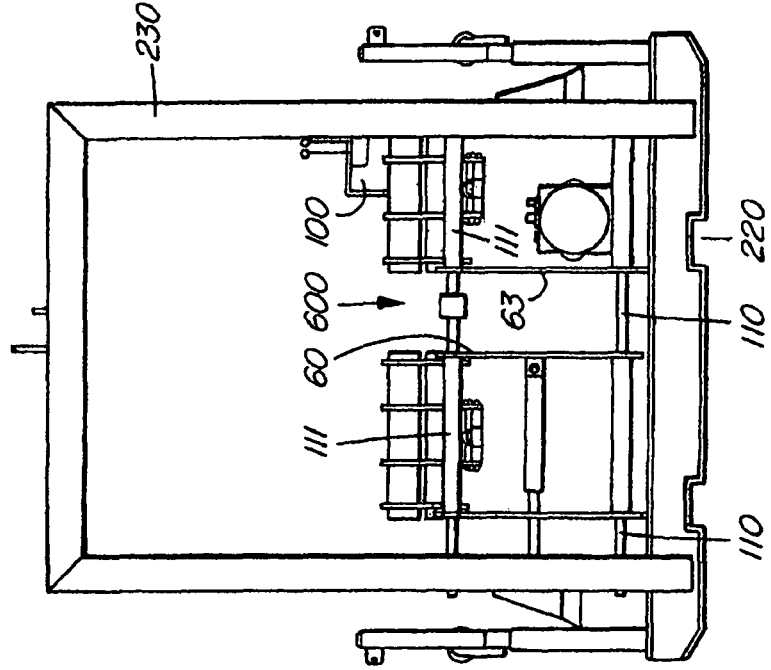
FIG. 18 is a back view of the embodiment according to FIGS. 1 and 2.
Figure 21:
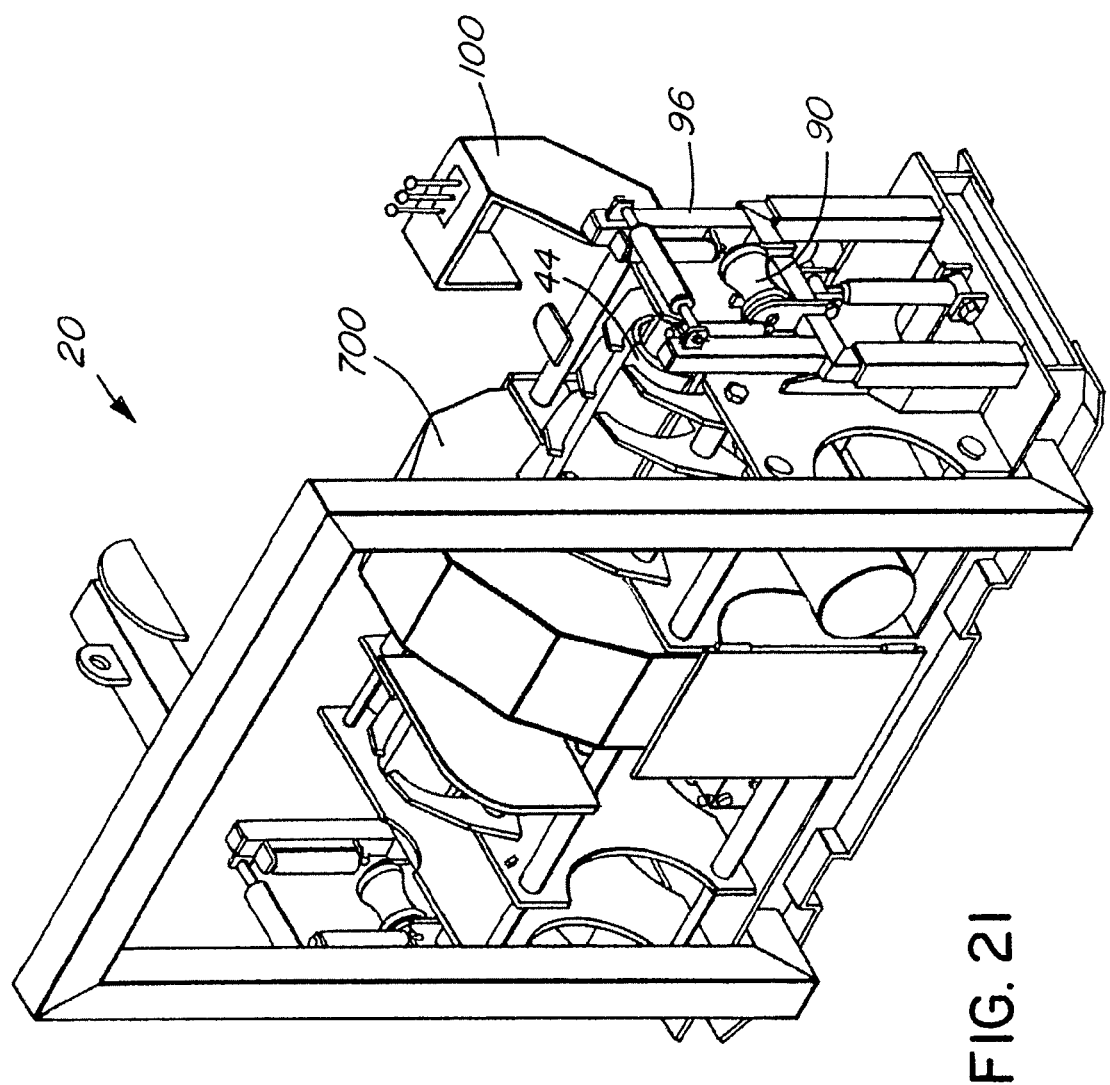
FIG. 21 is a rear perspective view of FIG. 20 with the cover closed.
Figure 23:
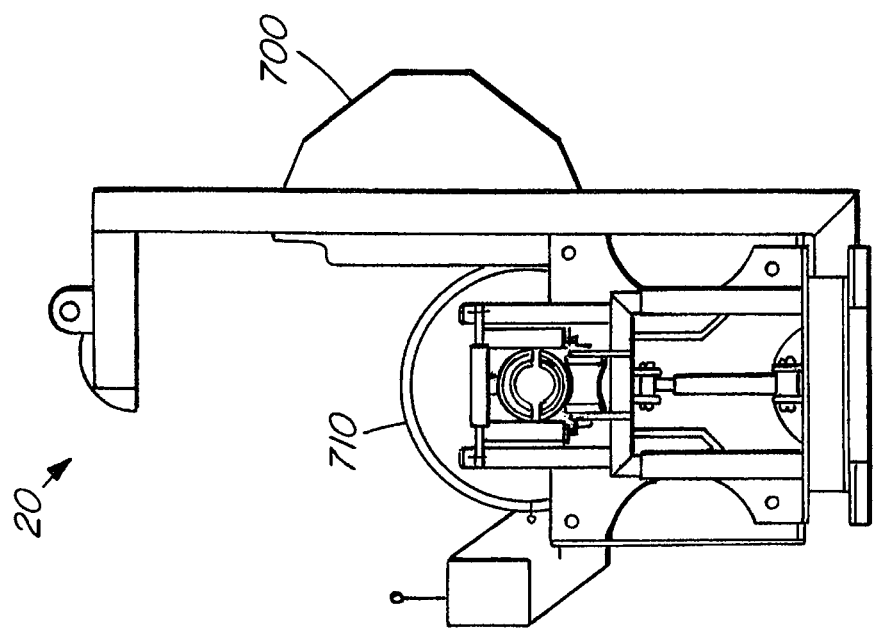
FIG. 23 is an end view of FIG. 20.
Figure 22:
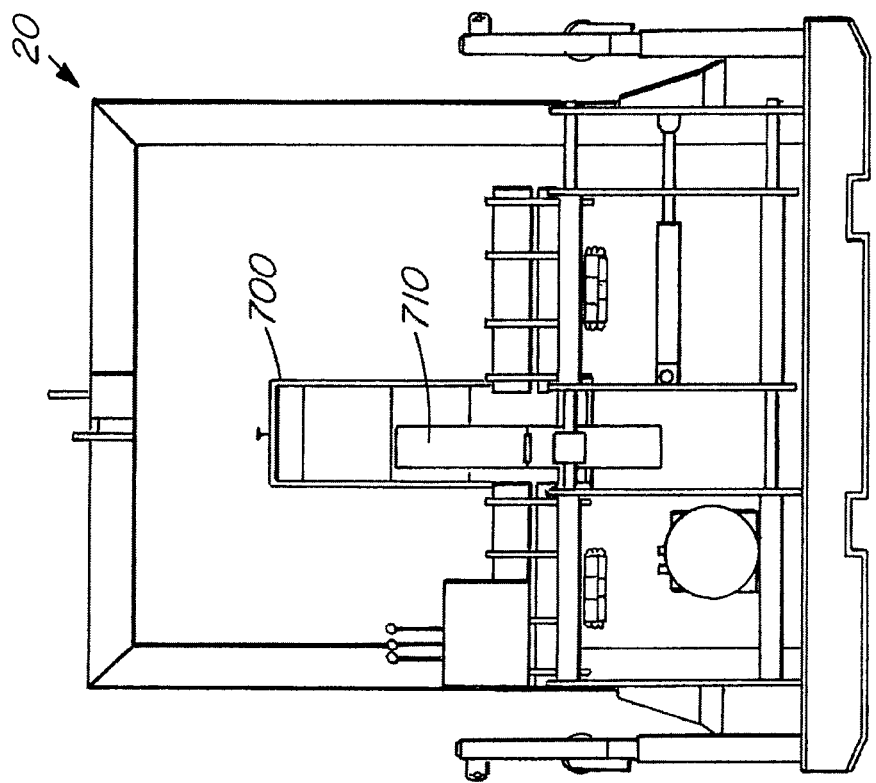
FIG. 22 is a front view of FIG. 20.
Figure 25:
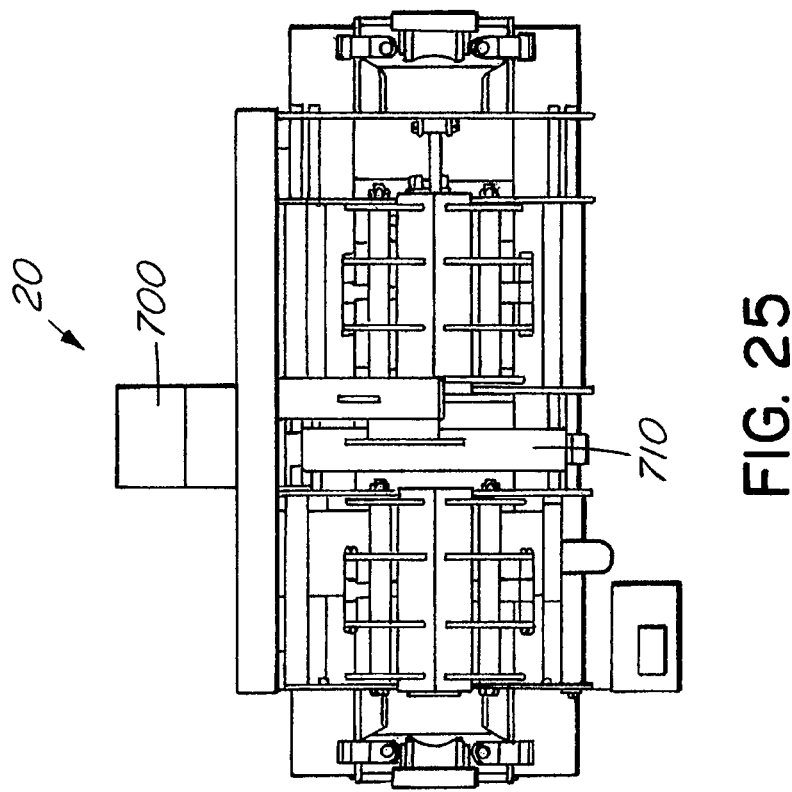
FIG. 25 is a top view according to FIG. 20.
Figure 24:
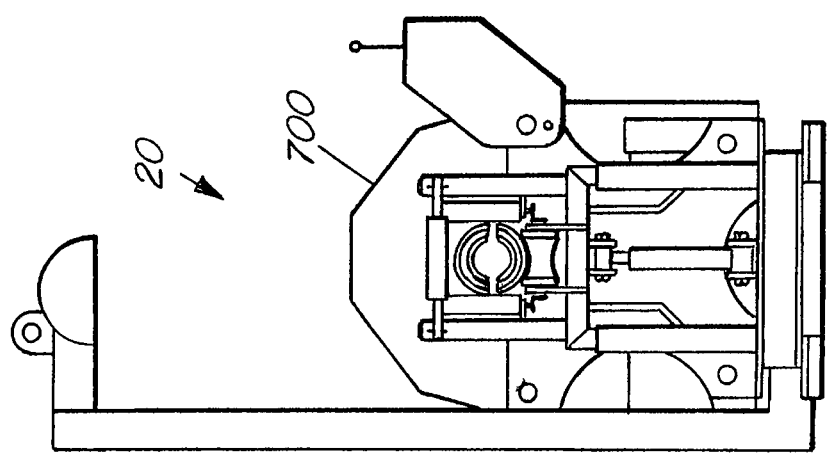
FIG. 24 is an end view of FIG.

As best seen with respect to FIGS. 15A and 15B, a clamp may accept a first channel defining reconforming die into cooperating relationship with its trough and a second channel defining die into cooperating relationship with a jaw to thereby define a part of the perimeter of the channel cross section. It will be apparent that the number and conformation of the reconforming dies will be adjusted to correspond with the numbers and geometry of the clamps provided. In embodiments the apparatus may accept a plurality of alternative clamps defining channels of different predetermined cross sections to allow a user to optionally select a range of predetermined channel cross sections. One or more of the clamps may be actuable to reconform the respective free ends of the first pipe or the second pipe or both. In an embodiment the clamp, or the dies, or the clamp and dies, may define an annulus, and the clamping surface may comprise one, two, three, four, five, six, seven, eight, nine, ten, or more, cooperating portions, which may be arcuate. In embodiments clamps comprise receiving surfaces 112 that may be adapted to receive dies.

Second Embodiment

A second embodiment 20 is described with particular reference to FIGS. 20 through 25. The basic structure of this embodiment is the same as the first embodiment but apparatus 20 may further comprise an orbital welder 300 (not shown), a cover 700 and additional shielding 702. The cover 700 may be suitable to exclude wind, rain and other outside conditions during the welding process. It may be clear or transparent to allow the operator to monitor the welding process. The cover 700 together with shielding 702 may be adapted to allow a user to control the atmosphere in which the welding process may be carried out, for example, it may be desired to carry out the weld under inert gases such as nitrogen. All the necessary modifications for these purposes will be readily understood and implemented by those skilled in the art.

In operation, the welding process may be carried out in generally the same manner as with the first embodiment, but with further steps associated with the operation of the orbital welder and the cover 700. The apparatus 20 may be positioned on the second free end 32 of the pipe 30, and the first free end 22 of pipe 20 and the ends 22 and 32 suitably positioned for welding. The first and second clamp assembles 150, 160 may be actuated to immobilise and reconform the opposed pipe ends. The cover 700 may be closed and the orbital welder 300 may be operated to join ends 22 and 32. Then the clamps and cover may be opened, and the welded pipe may be raised out of the troughs by raising the roller assemblies 90 provided. Then the apparatus 20 can be moved along to the next free end of the pipe and the operation repeated as desired to progressively extend the piping.

Third Embodiment

In a third embodiment there is provided a pipe reconforming clamp 40 for a welding machine 10, described with particular reference to FIGS. 1 through 10 and 16 through 19. The clamp 40 comprises one or more jaws 42, 44, 45, the clamp at least partly defining a channel for reconforming a free end 22 of a pipe 20 to be welded. The pipe 20 may be a metal pipe and the jaw may be elongated and one of the jaws may be a trough 42. In an embodiment a clamp may comprise a trough 42 and two opposed cooperating jaws 44, and 45. As illustrated in FIGS. 15A, 15B, clamps may accept cooperating pipe reconforming dies 410, 420 to thereby at least partly define a channel of predefined cross section. A clamp may comprise a plurality of jaws and may accept a plurality of alternate cooperating channel defining dies to thereby optionally define a plurality of alternate channel cross sections. The predetermined cross-section may be an annulus. A kit may also be provided comprising a set of channel defining dies for cooperating engagement with an elongated pipe clamp according to any of the embodiments.

Fourth Embodiment

Referring to FIGS. 1 through 8, and 20 through 25, there is also provided a method for welding pipes. In an embodiment, the pipes 20 and 30 to be welded may first be prepared by cleaning the free ends 22 and 32, which may comprise removing rust and scaling off pipe bevels. The method may further comprise hecking the free ends for damage or flat spots and removing damage by re-bevelling the free ends. The method may comprise providing a first clamp 40 for reconforming the first pipe 20 adjacent its first free end 22 and a second clamp 50 for reconforming the second pipe 30 adjacent to its second free end 32. In an embodiment, an orbital welder 300 may be positioned at the opposed first free end 22 of the first pipe 20 or of the second free end 32 of second pipe 30. In embodiments a welding hood 700 may be provided and where provided may be openable or may be transparent, as necessary to allow a user to ensure the orbital welder 300 is suitably positioned and will not be damaged by subsequent adjustments of the apparatus. The method may further comprise mounting the first and second clamps 40 and 50 in substantially coaxial relation and urging the first free end 22 of the first pipe 20 into close coaxial opposition with the second free end 32 of the second pipe 30 or vice versa.

Where provided, guide rollers 90, 96 may be raised and the free end 32 of the second pipe 30 may be lifted, moved into position in the trough 52 of the second clamp 50 and then lowered, with the lowering of the guide roller 90, and gripped by closing second clamp around the second pipe. Lateral guide rollers 95 may be provided to maintain the alignment of the pipe 30 during movement. The positioning of first pipe 20 may be achieved in a similar matter with the roller assembly 91 provided at the end of first clamp 40. The second pipe in the second clamp may then be advanced coaxially towards the first free end 22 of the first pipe 20. The orbital welder 300 may travel forward with the second pipe 30 and stop in the middle of the welding space 600. It may be necessary to make some minor adjustment by closing end pipe alignment closures around one or both pipes, using the gap adjustment hydraulic to close the gap between the opposed free ends to welding procedure tolerances, and rechecking for proper alignment. Suitable dies will be chosen to reconform the opposed free pipe ends to the correct cross-section so that they mutually conform within acceptable tolerances. A variety of adjustment and alignment devices and systems may be used within the apparatus and these will all be readily recognised and understood by those skilled in the art.

The opposed first and second free ends of the first and second pipes 20 and 30 may be welded together. The welder 300 may be lowered into position and then the welding hood 700 may be closed or in some embodiments the hood 700 and orbital ring 710 may be left substantially in position throughout operation. It will be understood that while an orbital welder apparatus 300 is shown, the welding itself may be accomplished manually or by any conventional techniques.

Once the weld is completed the clamps may be opened, the guide rollers/pipe guides raised to lift the welded pipe out of the receiving troughs, and the welder apparatus may be advanced so that the new free end of the welded pipe rests to protrude a suitable distance from the stationary clamp. A new pipe length may be positioned into the moveable clamp 50, the pipe ends may be lowered into the reconforming clamps which can then be closed and the process may be repeated.

Fifth Embodiment

In a fifth embodiment described particularly with reference to FIGS. 9 through 15, there is provided a pipe reconforming die for securing to a cooperating die receiving surface 112 of a pipe welding clamp 40. In the illustrated embodiment the inner clamping surface 450 of the die defines a part of an annular channel and a cooperating set of dies may thereby define an annular channel. Such a die or dies may be reversibly securable to suitable die receiving surfaces 112 of the clamp, and may have a clamping surface configured so that when the clamp is operated the clamping surface 450 may compressively reconform a workpiece pipe. The relationship of the dies to the clamps is best seen with reference to FIGS. 15A and 15B.

In an embodiment the die may be secured to a jaw of the clamp by bolting to the die receiving surface 112 and suitable bolt receiving holes 440 may be provided in dies 410 and 420 for this purpose. But it will be appreciated that many other means to secure the dies to the clamps may be suitable in particular embodiments and will be readily recognised, chosen from and implemented by those skilled in the art. By way of example, clipping, screwing, slidingly engaging, magnetically engaging, pinning, and any other method of conveniently reversibly attaching the die to the receiving surface will be suitable and a wide variety of possibilities will be recognised and implemented by those skilled in the art. In embodiments the attachment of a die to a clamp may not be readily reversible. A die may comprise a range of securing points, which may be holes 440, to facilitate such securing and such securing points may simply be holes to accept suitably sized bolts, and may be countersunk to preserve the regularity of the inner clamping surface when such bolts or equivalent are in place. Cooperating or corresponding securing points may be provided on the receiving clamp.

In embodiments a die may be provided as a part of a set comprising a plurality of dies, the dies for use with a clamp having a plurality of corresponding die receiving surfaces. The plurality of dies may be sized to define a channel of predetermined cross-section when mounted on their respective die receiving surfaces. In a further embodiment there may be provided a kit comprising a plurality of individual die sets, alternate ones of the individual die sets each being sized to define a channel of different cross-section.

The embodiments and examples presented herein are illustrative of the general nature of the subject matter claimed and are not limiting. It will be understood by those skilled in the art how these embodiments can be readily modified and/or adapted for various applications and in various ways without departing from the spirit and scope of the subject matter disclosed claimed. The claims hereof are to be understood to include without limitation all alternative embodiments and equivalents of the subject matter hereof. Phrases, words and terms employed herein are illustrative and are not limiting. Where permissible by law, all references cited herein are incorporated by reference in their entirety. It will be appreciated that any aspects of the different embodiments disclosed herein may be combined in a range of possible alternative embodiments, and alternative combinations of features, all of which varied combinations of features are to be understood to form a part of the subject matter claimed.

I claim:

1. An apparatus for use in welding a first pipe free end to a second pipe free end, said first and second pipe free ends each having a diameter of less than about 12 inches, said apparatus comprising:
   a) a guide rail;
   b) a first clamp mounted to the guide rail, the first clamp comprising
      a first horizontally extending trough defining a concave recess opening vertically configured to receive and support against gravity the first free end, and
      at least a first pair of opposed pivoting jaws, each of the opposed jaws of the first clamp pivotable about a different axle and actuable relative to the first trough between an open position and a closed position such that the first clamp defines a first pipe receiving channel portion configured to grip an outer surface of the first free end and compressively reconform an open cross-section of said first free end; and
   c) a second clamp mounted to the guide rail in axial alignment with the first clamp, the second clamp comprising
      a second horizontally extending trough defining a concave recess opening vertically configured to receive and support against gravity the second free end, and
      at least a second pair of opposed pivoting jaws, each of the opposed jaws of the second clamp pivotable about a different axle and actuable relative to the second trough between an open position and a closed position such that the second clamp defines a second pipe receiving channel portion configured to grip an outer surface of the second free end and compressively reconform an open cross-section of said second free end and cooperating with the first pipe receiving channel portion such as to form a channel, an open cross-section of said second free end,
   wherein at least one of said first and second clamps being actuable to move along the guide rail to hold said first pipe free end or said second pipe free end in close coaxial opposition with the other of said first pipe free end or said second pipe free end wherein the apparatus further comprises a movable frame configured to support the guide rail, and a roller assembly movably mounted to the movable frame and configured to support the first pipe or the second pipe, the roller assembly being configured for movement relative to the frame between a first position where the first free end or the second free end is disposed in the first trough or the second trough, and a second position vertically spaced from the first position such that said first pipe free end or second pipe free end is suspended above the first trough or the second trough, respectively, and wherein the frame or the pipe is configured such that said frame or pipe can be advanced in an axial direction when the roller assembly is in the second position.

2. The apparatus according to claim 1, further comprising a die defining an annular channel, wherein at least one of said first and second clamps is configured to receive the die, wherein said die at least partly defines the pipe receiving channel.

3. The apparatus according to claim 2, wherein one of said first and second pipe free ends is an end of a pipeline.

4. The apparatus according to claim 1, further comprising a cover.

5. The apparatus according to claim 1, wherein at least one of said first and second pipe free ends is a free end of a metal pipe.

6. A method for use in welding together a first pipe free end and a second pipe free end, said first and second pipe free ends each having a diameter of less than about 12 inches, said method comprising the steps of:
   providing a guide rail;
   mounting a first clamp to the guide rail, the first clamp comprising
      a first horizontally extending trough defining a concave recess opening vertically for receiving the first free end, and
      at least a first pair of opposed pivoting jaws, each of the opposed jaws of the first clamp pivotable about a different axle and actuable relative to the first trough between an open position and a closed position such that the first clamp defines a first pipe receiving channel portion configured to grip an outer surface of the first free end;
   mounting a second clamp mounted to the guide rail in axial alignment with the first clamp, the second clamp comprising
      a second horizontally extending trough defining a concave recess opening vertically for receiving the second free end, and
      at least a second pair of opposed pivoting jaws, each of the opposed jaws of the second clamp pivotable about a different axle and actuable relative to the second trough between an open position and a closed position where the second clamp defines a second pipe receiving channel portion configured to grip an outer surface of the second free end;
   supporting against gravity both the first pipe free end in the first trough and the second pipe free end in the second trough;
   compressively reconforming in the first clamp and the second clamp an open cross-section of said first and second pipe free ends;
   moving at least one of said first and second clamps along the guide rail; and
   after said compressively reconforming, holding first and second pipe free ends in close coaxial opposition and wherein the method further comprises the steps of providing a frame configured to support the guide rail and providing a roller assembly movably mounted to said frame and configured to support the first pipe or the second pipe, moving the roller assembly from a first position where the first free end or the second free end is disposed in the first trough or in the second trough, respectively, to a second position vertically spaced from the first position such that said first free end or second free end is suspended above the first trough or the second trough, respectively, and advancing the frame or the first or second pipe axially when the roller is in the second position.

7. The method according to claim 6, further comprising a step of orbitally welding said opposed first and second pipe free ends together.

8. The method according to claim 6, further comprising a step of lining said first and second clamps with reconforming dies for at least partly defining the pipe receiving channel, wherein the reconforming step comprises reconforming the first and second pipe free ends to matching cross sections for welding.

9. The apparatus according to claim 1, wherein one of said first and second pipe free ends is an end of a pipeline.

10. The apparatus according to claim 3, further comprising an orbital welder.

11. The method according to claim 6 wherein one of said first and second pipe free ends is a free end of a pipeline.

\* \* \* \* \*